(12) United States Patent
Ha et al.

(10) Patent No.: US 7,621,139 B2
(45) Date of Patent: Nov. 24, 2009

(54) SUPERCOOLING APPARATUS AND CONTROL METHOD THEREOF

(75) Inventors: Joo Young Ha, Seoul (KR); Jae Seung Lee, Hwaseong-Gun (KR); Kyung Hee Hahm, Seoul (KR); Hye Ran Lee, Goonpo-Si (KR); Jeong Han Kim, Suwon-si (KR); Young Shik Shin, Seongnam-si (KR); Chank Hak Lim, Hwasung-si (KR); Won Jae Yoon, Seoul (KR); Jung Soo Lim, Seoul (KR); Yong Han Kim, Cheonan-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 392 days.

(21) Appl. No.: 11/482,047

(22) Filed: Jul. 7, 2006

(65) Prior Publication Data

US 2007/0163275 A1    Jul. 19, 2007

(30) Foreign Application Priority Data

Jan. 14, 2006   (KR)   .................. 10-2006-0004203

(51) Int. Cl.
*F25C 1/00*   (2006.01)
(52) U.S. Cl. .......................................... 62/135; 62/340
(58) Field of Classification Search .................. 62/125, 62/126, 127, 128, 129, 130, 131, 135, 186, 62/389, 340, 3.2; 426/7
See application file for complete search history.

(56) References Cited

U.S. PATENT DOCUMENTS

| 4,358,932 | A  | * | 11/1982 | Helfrich, Jr. ................. | 62/126 |
| 5,969,606 | A  | * | 10/1999 | Reber et al. .................. | 340/540 |
| 6,601,394 | B2 | * | 8/2003  | Tatter .......................... | 62/127 |
| 6,880,949 | B2 | * | 4/2005  | Miozza et al. ................ | 362/92 |
| 2005/0142269 | A1 | * | 6/2005 | Scullion et al. ............. | 426/524 |
| 2006/0131423 | A1 | * | 6/2006 | Truong ........................ | 235/486 |
| 2007/0163289 | A1 | * | 7/2007 | Hahm et al. .................. | 62/408 |
| 2008/0184719 | A1 | * | 8/2008 | Lowenstein ................. | 62/127 |

FOREIGN PATENT DOCUMENTS

JP    2003-214753    7/2003

OTHER PUBLICATIONS

Official Action issued by the Russian Patent Office in the corresponding Russian Application No. 2006127367/12 (029739) (3 pages) (English translation consisting of 3 pages).

* cited by examiner

*Primary Examiner*—Marc E Norman
(74) *Attorney, Agent, or Firm*—Staas & Halsey LLP

(57) ABSTRACT

A supercooling apparatus and a control method thereof. The method controls the supercooling apparatus having a storage compartment defined therein, and includes confirming beverages in the storage compartment, obtaining a proper supercooling temperature of each beverage, and controlling the storage compartment to have the proper supercooling temperature.

14 Claims, 8 Drawing Sheets

Fig.3A

| Temperature of storage compartment [°C] | -3.5 | -4.0 | -4.5 | -5.0 | -5.5 | -6.0 | -6.5 | -7.0 | -7.5 | -8.0 |
|---|---|---|---|---|---|---|---|---|---|---|
| Success ratio [%] | 99.48 | 98.87 | 97.91 | 95.68 | 92.4 | 87.48 | 80.69 | 72.03 | 61.82 | 50.72 |
| Critical supercooling degree | | | 4.5 | 5.0 | 5.5 | | | | | |

Standard slush level

Fig.3B

| Temperature of storage compartment [°C] | -5.5 | -6.0 | -6.5 | -7.0 | -7.5 | -8.0 |
|---|---|---|---|---|---|---|
| Success ratio [%] | 99.99 | 99.95 | 99.79 | 99.25 | 97.71 | 94.07 |
| Critical supercooling degree | | | 4.6 | 5.1 | 5.6 | |

Standard slush level

Fig.3C

| Temperature of storage compartment [°C] | -5.5 | -6.0 | -6.5 | -7.0 | -7.5 | -8.0 |
|---|---|---|---|---|---|---|
| Success ratio [%] | 100.0 | 99.99 | 99.96 | 99.80 | 99.24 | 98.00 |
| Critical supercooling degree | 4.5 | 5 | 5.5 | | | |

Standard slush level

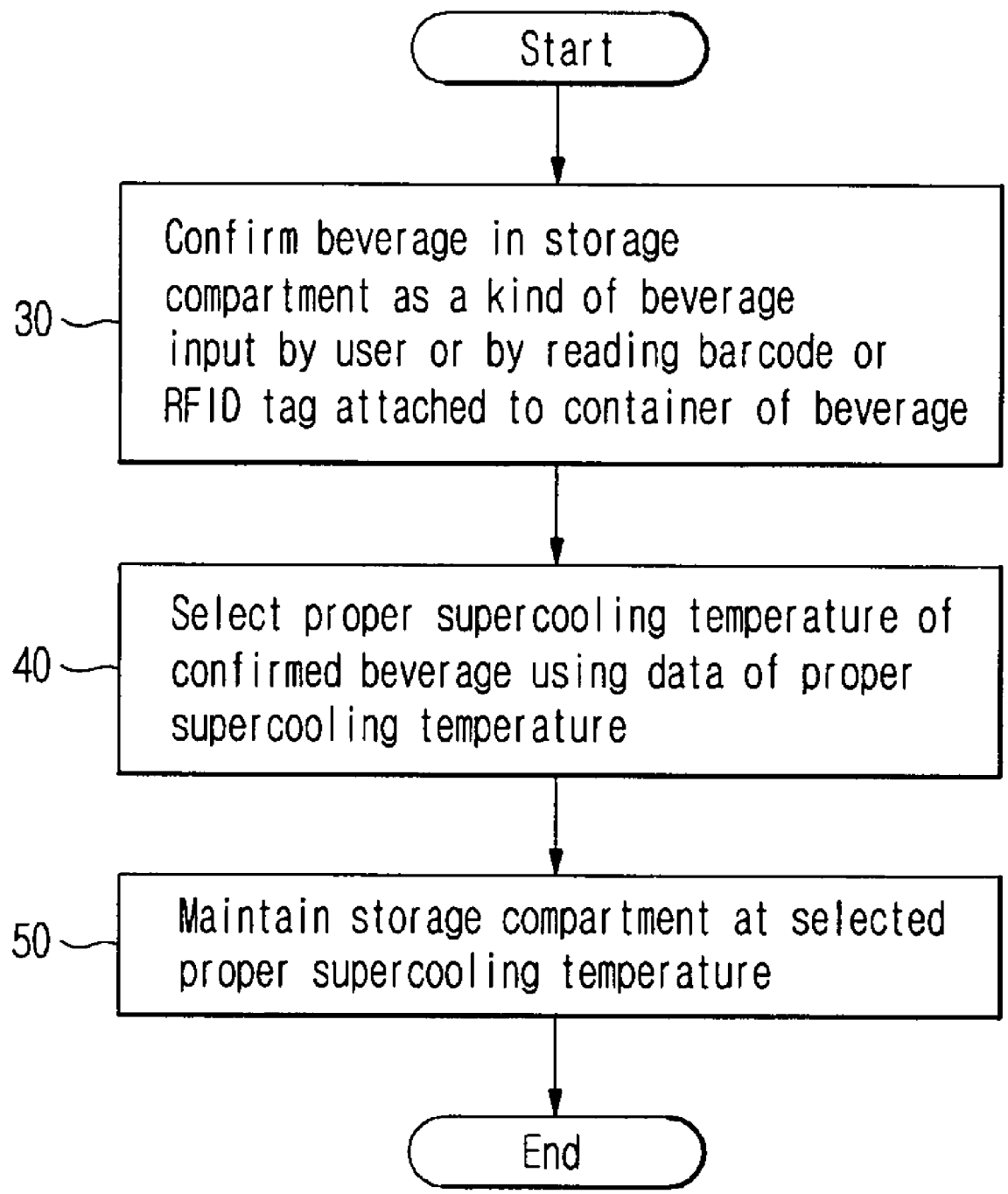

SUPERCOOLING APPARATUS AND CONTROL METHOD THEREOF

CROSS-REFERENCE TO RELATED APPLICATIONS

This application claims the benefit of Korean Patent Application No. 2006-0004203, filed on Jan. 14, 2006 in the Korean Intellectual Property Office, the disclosure of which is incorporated herein by reference.

BACKGROUND OF THE INVENTION

1. Field of the Invention

The present invention relates to a supercooling apparatus and a control method thereof. The present invention relates to a supercooling apparatus, which can control supercooling temperatures differently according to a kind of beverage when storing various beverages in a supercooled state, and a control method thereof.

2. Description of the Related Art

Generally, a refrigerator includes a refrigerating compartment and a freezing compartment, and provides the simple function of storing various foods at low temperatures. Recently, there has been proposed a new type of refrigerator, which can satisfy not only the function of storing various foods at low temperatures, but also the function of producing supercooled beverages, which can be used for making, for example, a slush beverage, using a supercooling apparatus.

At this time, the slush beverage has a coexistence state wherein a solid phase and a liquid phase coexist. The beverage generally changes in phase from liquid to solid below a freezing point at a pressure of 1 atm, but in some cases, it is in a supercooled state not in the solid phase. Such a state wherein a liquid is in a supercooled state not in the solid phase below the freezing point is thermodynamically called a meta-stable state. When the beverage is in the meta-stable state, the beverage is in neither an equilibrium state nor a completely unstable state. Thus, if there is external disturbance, the beverage instantaneously changes in phase from the supercooled state to the solid phase. In other words, when the supercooled beverage is poured to a cold cup, or subjected to impact or vibration, it becomes the slush beverage wherein the phase thereof is not in a completely frozen or melted state. At this time, since a temperature range for maintaining the beverages in the supercooled state is determined by contents of the beverages and other factors, the temperature ranges for maintaining the beverages are generally different from one another according to the kind of beverage.

Various types of supercooling apparatus are well known in the art. For example, Japanese Laid-open Patent Publication No. 2003-214753 discloses a refrigerating apparatus for supercooling beverages. The refrigerating apparatus of the publication includes a chilled air supplying duct and chilled air suctioning duct respectively positioned along opposite sides of a storage compartment in a body, a connection duct positioned along an upper side of the storage compartment to connect the chilled air supplying duct to the chilled air suctioning duct, a fan installed to the connection duct, a chilled air outlet port positioned in the chilled air supplying duct, and a chilled air suction port positioned in the chilled air suctioning duct to make the beverages in a supercooled state within the storage compartment.

However, disregarding the fact that the beverages are frozen from the supercooled state at different freezing points, the conventional refrigerating apparatus stores all the beverages at the same temperature in the storage compartment, causing a problem in that some beverages are frozen earlier from the supercooled state than others. In other words, when a certain beverage having a higher freezing point than that of other beverages is stored at a lower temperature than its freezing point within the storage compartment, the beverage is frozen earlier from the supercooled state than others.

In addition, disregarding the fact that a critical supercooling degree (difference between a storing temperature and a freezing point) of a certain beverage changes according to the storing temperature and the freezing point, and that a ratio of supercooled grains (hereinafter referred to as a "slush level") in a slush beverage also changes according to the critical supercooling degree, the conventional refrigerating apparatus stores all the beverages at the same temperature, causing a problem in that the slush level is different according to kinds of beverage.

SUMMARY OF THE INVENTION

Accordingly, it is an aspect of the present invention to provide a supercooling apparatus, which preserves beverages while allowing supercooling temperatures thereof to be controlled according to a kind of beverage, and a control method thereof.

Additional aspects and/or advantages of the invention will be set forth in part in the description which follows and, in part, will be apparent from the description, or may be learned by practice of the invention.

In accordance with one aspect of the present invention, a method for controlling a supercooling apparatus having a storage compartment defined therein includes: confirming beverages in the storage compartment; obtaining a proper supercooling temperature of each beverage; and controlling the storage compartment to have the proper supercooling temperature.

The proper supercooling temperature may be obtained from data of proper supercooling temperature previously stored in a memory.

The data of proper supercooling temperature may include a standard slush level, and a success ratio of each beverage corresponding to a temperature of the storage compartment.

In obtaining the proper supercooling temperature, the proper supercooling temperature may be set with reference to the success ratio.

In obtaining the proper supercooling temperature, the proper supercooling temperature may be set with reference to the standard slush level.

In obtaining the proper supercooling temperature, one of the success ratio and the standard slush level may be determined as a selection standard for the proper supercooling temperature according to a standard input by a user.

In obtaining the proper supercooling temperature, one of the success ratio and the standard slush level may be automatically determined as a selection standard for the proper supercooling temperature according to kinds of container containing the beverages.

The kinds of container may be confirmed via a barcode or an RFID tag attached to each of the containers.

Each of the beverages in the storage compartment may be confirmed as a kind of beverage input by a user or by reading a barcode or a RFID tag attached to a container of the beverage.

The supercooling temperature may be obtained from the data of proper supercooling temperature stored in the barcode or the RFID tag.

In accordance with another aspect of the present invention, a method for controlling a supercooling apparatus having a plurality of storage compartments formed therein may include: confirming beverages in the plural storage compartments; obtaining a proper supercooling temperature of a beverage in each storage compartment; and controlling each storage compartment to have an associated proper supercooling temperature.

In accordance with yet another aspect of the present invention, a supercooling apparatus may include: a storage compartment to store beverages; a refrigerating unit to refrigerate the storage compartment; and a controller to confirm the beverages in the storage compartment, followed by obtaining a proper supercooling temperature of each beverage, and controlling the storage compartment to have the proper supercooling temperature.

The supercooling apparatus may further include a memory to store data of proper supercooling temperature for each beverage.

The data of proper supercooling temperature may include a standard slush level, and a success ratio of each beverage corresponding to a supercooling temperature of the beverage.

The controller may determine one of the success ratio and the standard slush level as a selection standard for the proper supercooling temperature according to user's selection.

The controller may determine one of the success ratio and the standard slush level as a selection standard for the proper supercooling temperature according to kinds of container containing the beverages.

The supercooling apparatus may further include a barcode reader to read a barcode attached to the container of each beverage or an RFID reader to read an RFID tag attached to the container of the beverage, wherein the kinds of container containing the beverages are confirmed via the barcodes or the RFID tags attached to the containers.

The supercooling apparatus may further include an input unit through which kinds of beverage stored in the storage compartment are input by a user, and the controller confirms the beverages in the storage compartment as the kinds of beverage input by the user.

The supercooling apparatus may further include a barcode reader to read a barcode attached to a container of each beverage or an RFID reader to read an RFID tag attached to the container of the beverage, wherein the controller confirms the beverages in the storage compartment by reading the barcodes or the RFID tags attached to the containers of the beverages.

The controller may obtain the proper supercooling temperature from the data of proper supercooling temperature stored in the barcode or the RFID tag.

In accordance with yet another aspect of the present invention, a supercooling apparatus may include: a plurality of storage compartments to store beverages; a refrigerating unit to refrigerate the plural storage compartments; and a controller to confirm the beverages in the storage compartments, to obtain a proper supercooling temperature of each beverage, and to control each storage compartment to have an associated proper supercooling temperature.

BRIEF DESCRIPTION OF THE DRAWINGS

These and/or other aspects and advantages of the invention will become apparent and more readily appreciated from the following description of the embodiments, taken in conjunction with the accompanying drawings, of which:

FIGS. 3A to 3C are tables illustrating data of proper supercooling temperature of each beverage stored in a memory;

FIG. 4 is a flow diagram illustrating a method for controlling the supercooling apparatus in accordance with the first embodiment;

DETAILED DESCRIPTION OF THE PREFERRED EMBODIMENTS

Reference will now be made in detail to the embodiments of the present invention, examples of which are illustrated in the accompanying drawings. The embodiments are described below to explain the invention by referring to the figures.

Figure 1:
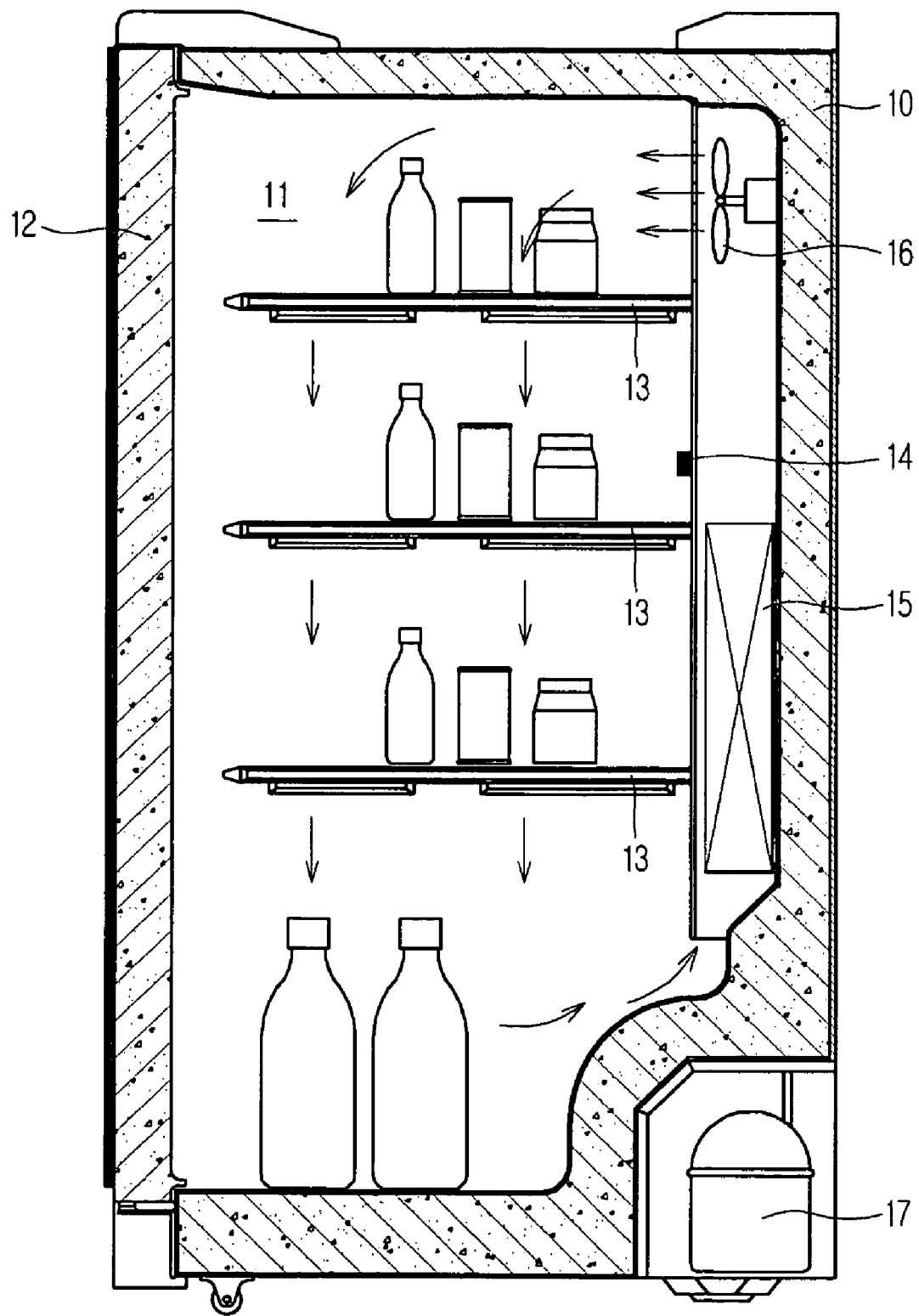
FIG. 1 is a side elevation illustrating a supercooling apparatus in accordance with a first embodiment of the present invention.

As shown in FIG. 1, a supercooling apparatus in accordance with a first embodiment of the present invention includes a body 10 having a storage compartment 11 defined longitudinally therein, a storage compartment door 12 hingably attached to the storage compartment 11 to open or close an opening of the storage compartment 11, a plurality of shelves 13 provided in the storage compartment 11 to receive beverages thereon, and a temperature sensor 14 to detect the temperature of the storage compartment 11. The storage compartment 11 is provided, at a rear side, with a heat exchanger 15 through which heat exchange occurs between inner air of the storage compartment 11 and a refrigerant, a circulation fan 16 to forcibly circulate the inner air, and a compressor 17 to compress the refrigerant.

Figure 2:
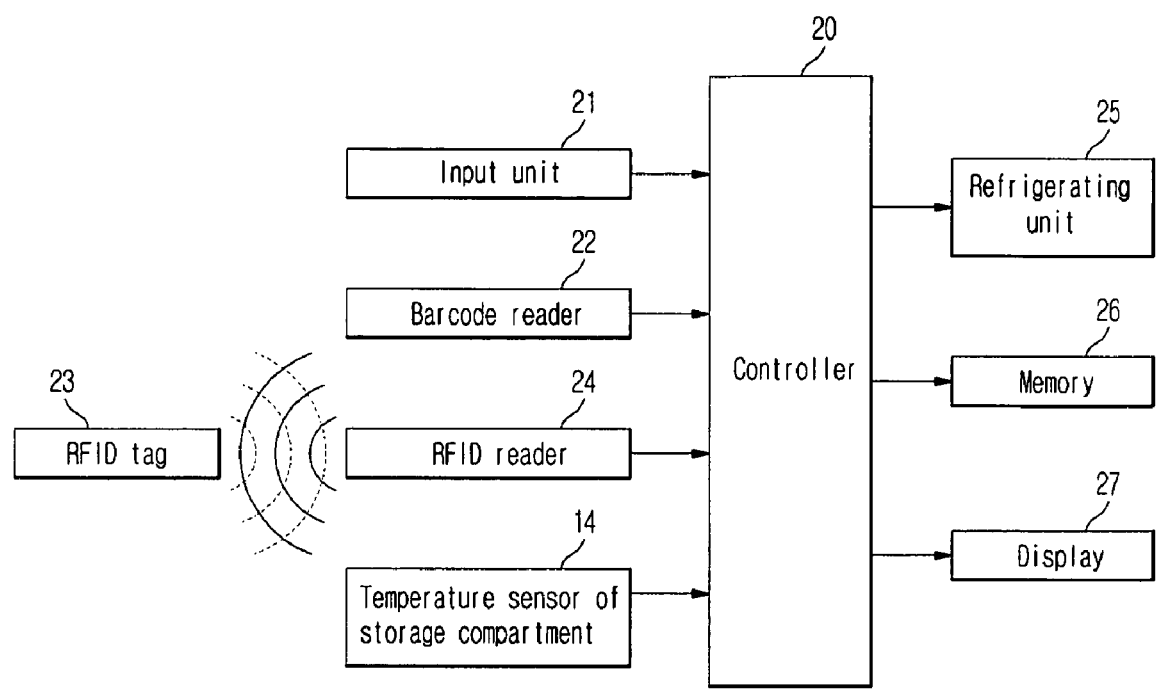
FIG. 2 is a block diagram illustrating a control system of the supercooling apparatus in accordance with the first embodiment.

As shown in FIG. 2, the supercooling apparatus of the first embodiment further includes an input unit 21, a barcode reader 22, an RFID reader 24, a memory 26, a controller 20 to control operation of the supercooling apparatus, and a display 27 to display operation of the supercooling apparatus, in addition to the components shown in FIG. 1. In FIG. 2, components, such as the compressor 17, the circulating fan 16, the heat exchanger 15 and the like, used to refrigerate the storage compartment 11 are totally referred to as a refrigerating unit 25.

The input unit 21 is provided to input kinds of beverage and a selection standard of proper supercooling temperature of respective beverages stored in the storage compartment 11. For this purpose, the input unit 21 is provided with buttons (for example, a juice button, a canned coffee button, and the like) on which titles of the beverages are printed, a success ratio button selected when a user wants to set a proper supercooling temperature of each beverage with reference to a success ratio, a standard slush level button selected when the user wants to set the proper supercooling temperature of each beverage with reference to a standard slush level, and the like. Here, the proper supercooling temperature, the success ratio, and the standard slush level will be described below with reference to the memory 26.

Input of the kinds of beverage stored in the storage compartment may be performed in a different manner from that as described above. For example, the input unit 21 is provided with a direction shifting button (not shown) and an enter button (not shown) such that titles of various beverages are sequentially displayed on the display 27 by pressing the direction shifting button, and when the title of a desired beverage stored in the storage compartment 1 is displayed on the display 27, the beverage is allowed to be chosen using the enter button.

The barcode reader 22 reads a barcode attached to a package of each beverage. Every article of commerce available in the market has a barcode with which the article can be discriminated. Since the barcode includes a manufacturer code, a product code (UPC, KAN standard), and the like, it is possible to discriminate a manufacturer of an article, and a kind of article by reading an associated barcode. Thus, the controller 20 can confirm the kind of beverage stored in the storage compartment 11 by analyzing the barcode read by the barcode reader 22.

The RFID reader 24 detects an RFID tag 23 attached to a package (container) of each beverage. The RFID tag 23 includes an IC chip (not shown) in which an identification ID of each beverage is stored in a memory thereof, and an antenna (not shown). The RFID reader 24 includes a coil-shaped antenna (not shown) to generate magnetic flux having a predetermined frequency at a constant time interval such that the magnetic flux generated from the antenna of the RFID reader 24 links with magnetic flux at the coil-shaped antenna of the RFID tag 23. Then, when electric power is generated via linkage of the magnetic fluxes from the antenna at the RFID tag 23 side, the RFID tag 23 transfers the data stored in the memory of the RFID tag 23 to the RFID reader 24 using the electric power, so that communication occurs between the RFID reader 24 and the RFID tag 23. When the RFID reader 24 detects the RFID tag 23, the controller 20 can confirm the beverage stored in the storage compartment 11 by means of the identification ID transferred from the RFID tag 23.

The memory 26 stores data of proper supercooling temperature of the respective beverages, an analyzing rule used when analyzing the barcode, identification IDs for various beverages, and the like. The data of proper supercooling temperature includes a success ratio, and a standard slush level.

Here, the term "success ratio" means a probability of a beverage to exist in a supercooled state at a certain temperature in the storage compartment. As a test to find a success ratio of water as one of the beverages, after forty-eight test containers, each of which has 500° C. of water, were placed in the storage compartment 11, the temperature of the storage compartment 11 was gradually lowered. As a result, it could be appreciated that the water in the test containers was not frozen at the same temperature. FIG. 3A is a table showing the relationship between the temperature of the storage compartment and the success ratio obtained by the test. Here, the success ratio is calculated by the following expression: (the number of test containers in which the water is not frozen at an associated temperature of the storage compartment/the total number of test containers)*100 (%). It can be appreciated from FIG. 3A that, when the temperature of the storage compartment is −3.5° C., the success ratio is 99.48%, but when the temperature thereof is −4.0° C. or less, the success ratio is decreased below 99%.

Manufacturers of the supercooling apparatus can store the test result in the memory as data of proper supercooling temperature such that the controller 20 sets a proper supercooling temperature of the beverage based on the data. For example, if the supercooling temperature of the beverage is set to a lowest temperature among temperatures of the storage compartment which can provide a success ratio of 99% or more, the controller 20 sets the proper supercooling temperature of water to −3.5° C. with reference to the table shown in FIG. 3A.

FIGS. 3B and 3C show test data obtained by supercooling orange juice and bottled coffee by the method as described above. Thus, the manufacturers of the supercooling apparatus can store the test result in the memory 26 such that the controller 20 sets proper supercooling temperatures of the orange juice and the bottled coffee with reference to the success ratios thereof. Referring to FIGS. 3B and 3C, it can be appreciated that, when the proper supercooling temperatures of the orange juice and the bottled coffee are set with reference to the success ratios, the proper supercooling temperatures of the orange juice and the bottled coffee are different from that of water (For example, the proper supercooling temperature of the orange juice is −7.0° C., and the proper supercooling temperature of the bottled coffee is −7.5° C.)

The slush level is related to a critical supercooling degree of the beverage (difference between a freezing point and a temperature at which the beverage starts freezing), and increases as the critical supercooling degree increases. In addition, when the slush level is classified into high, middle and low levels, the standard slush level means a middle slush level. In the table shown in FIG. 3A, the critical supercooling degree is shown in addition to the relationship between the temperature of the storage compartment 11 and the success ratio. Referring to FIG. 3A, it can be appreciated that, as the temperature of water is gradually lowered, the success ratio is reduced while the critical supercooling temperature is increased.

As with the success ratio, the manufacturers of the supercooling apparatus can also store the standard slush level as the data of proper supercooling temperature in the memory 26 such that the controller 20 sets the proper supercooling temperature of water with reference to the data. For example, referring to FIG. 3A, the controller 20 determines that the storage compartment has to be in a temperature range of −4.5~−5.5° C. in order to allow water to have the standard slush level, and can select a temperature included in this range as a proper supercooling temperature of water.

FIGS. 3B and 3C show test data obtained by supercooling the orange juice and the bottled coffee by the method as described above. Thus, the manufacturers of the supercooling apparatus can also store the test result in the memory 26 such that the controller 20 sets proper supercooling temperatures of the orange juice and the bottle coffee with reference to the standard slush level thereof. At this time, referring to FIGS. 3B and 3C, it can be appreciated that, when the proper supercooling temperatures of the orange juice and the bottled coffee are set with reference to the success ratios, the proper supercooling temperatures thereof are different from that of water.

Although the above description is given using three beverages as an example for convenience in this embodiment, the present invention is applicable to other beverages to obtain the proper supercooling temperatures thereof by the method as described above.

In addition, although the proper supercooling temperature is illustrated as being stored in the memory 26 in this embodiment, the proper supercooling temperature may be stored in the barcode or in the RFID tag 23. In this case, the controller 20 sets the proper supercooling temperatures of beverages by analyzing the barcode or the data transferred from the RFID tag 23.

A method for controlling the supercooling apparatus in accordance with the first embodiment will be described with reference to FIG. 4. Before launching the supercooling apparatus, manufacturers of the supercooling apparatus store data of proper supercooling temperature in the memory 26 after performing tests for a plurality of beverages as described above.

After placing beverages desired to be supercooled in the storage compartment 11, a user presses any of the buttons on the input unit 21 to input kinds of beverage stored in the storage compartment 11. Then, the controller 20 analyses the content input by the user, and confirms the kinds of beverage to be stored in the storage compartment 11 (30).

Alternatively, as the user brings a barcode of a certain beverage as a supercooling object near the barcode reader 22 in order to allow the controller to confirm the beverage by means of the barcode without using the input unit 21, the barcode reader 22 reads the barcode of the beverage, and then the controller 20 confirms the beverage to be stored in the storage compartment 11 by analyzing the barcode based on the analyzing rule of the memory 26 (30).

On the other hand, in the case where a RFID tag 23 is attached to a package or a container of a certain beverage, the RFID reader 24 communicates with the RFID tag 23 attached thereto, and receives an identification ID of the beverage. Then, the controller 20 confirms the kind of beverage to be stored in the storage compartment 11 after searching the kind of beverage corresponding to the received identification ID from the memory 26 (30).

Figure 5:
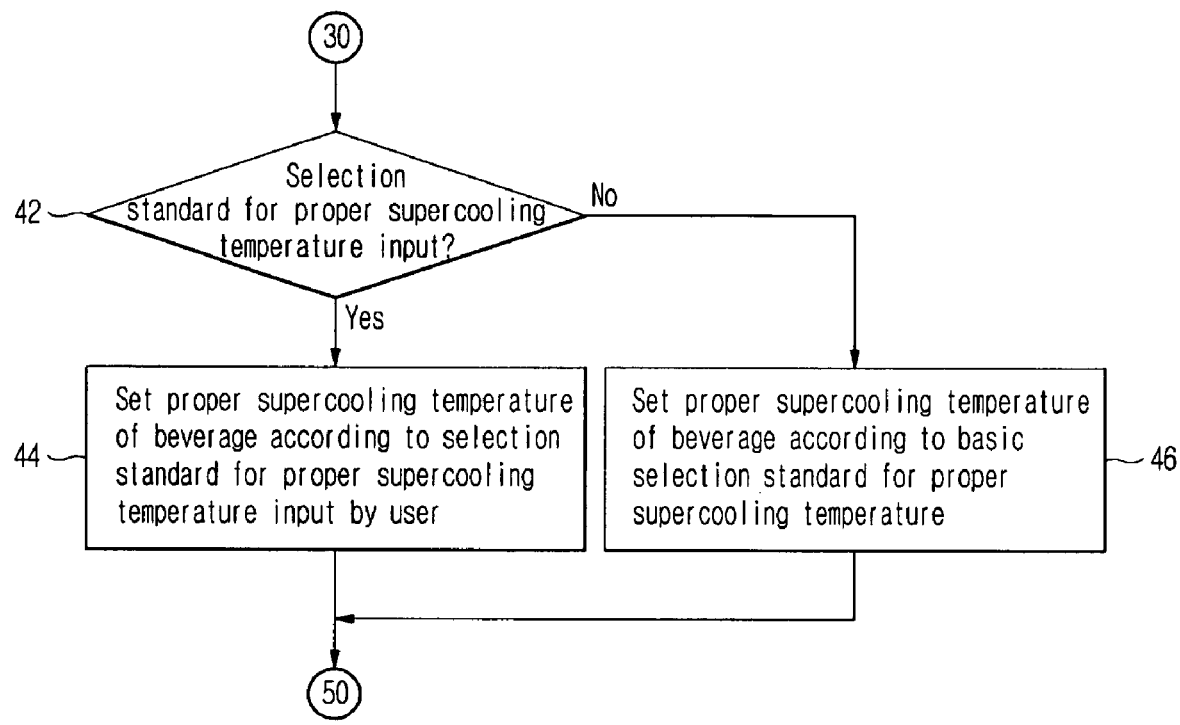
FIG. 5 is a flow diagram illustrating a supercooling temperature selecting operation (40) of FIG. 4 in detail.

After confirming the kind of beverage stored in the storage compartment 11, the controller 20 selects a proper supercooling temperature of an associated beverage based on data of proper supercooling temperature stored in the memory (40). This process will be described in detail with reference to FIG. 5. For selection of the proper supercooling temperature, the controller 20 determines whether or not a selection standard for proper supercooling temperature is input by the user (42). At this time, the selection standard for proper supercooling temperature includes a success ratio, and a standard slush level. Thus, if the user presses a success ratio button on the input unit 21, the success ratio becomes the selection standard for proper supercooling temperature, and if the user presses a standard slush level button on the input unit 21, the standard slush level becomes the selection standard for proper supercooling temperature.

If it is determined in the operation denoted by 42 that the selection standard for proper supercooling temperature is input by the user, the controller 20 sets the proper supercooling temperature of the associated beverage with reference to the selection standard for proper supercooling temperature input by the user (44). In other words, if the user selects the success ratio as the selection standard for proper supercooling temperature, the proper supercooling temperature of the beverage is set with reference to the success ratio. On the other hand, if the user selects the standard slush level as the selection standard for proper supercooling temperature, the proper supercooling temperature of the beverage is set with reference to the standard slush level.

On the contrary, if it is determined in the operation denoted by 42 that the selection standard for proper supercooling temperature is not input, the controller 20 sets the proper supercooling temperature of the beverage with reference to a basic selection standard (46). The basic selection standard is set by the user to any one of the success ratio and the standard slush level such that, if the user does not select the selection standard for proper supercooling temperature, the proper supercooling temperature of the beverage is automatically set with reference to one of the success ratio and the standard slush level.

In addition, the basic selection standard may be set in consideration of both the success ratio and the standard slush level. For example, the temperature of the storage compartment, which allows the beverage to have the standard slush level while having a success ratio of 92%, may be set as the proper supercooling temperature with the basic selection standard.

Furthermore, it is possible to automatically set the basic selection standard differently according to kinds of container respectively containing beverages. For example, if the container is a glass bottle, since it is more important to maintain the beverage in a state of not being frozen than any other things, the proper supercooling temperature is set with reference to the success ratio rather than the slush level. On the other hand, if the container is made of a plastic material or a pack, since the container is unlikely to be broken even when the beverage therein is frozen, the proper supercooling temperature is set with reference to the standard slush level rather than the success ratio. In this regard, this operation can be performed only in the conditions that data indicating whether the container of the beverage is the glass bottle or the plastic container is stored in the barcode or the RFID tag 23, thereby allowing the controller 20 to confirm the kinds of container containing the beverages using the data.

After the proper supercooling temperature is determined in the operation denoted by 40, the controller 20 operates the refrigerating unit 25 such that the temperature of the storage compartment 11 becomes the determined proper supercooling temperature (50). When controlling the temperature of the storage compartment 11, the controller 20 monitors the temperature of the storage compartment with an output of the temperature sensor in the storage compartment 11, and controls the refrigerating unit 25 to allow the storage compartment 11 to have a proper supercooling temperature.

Figure 6:
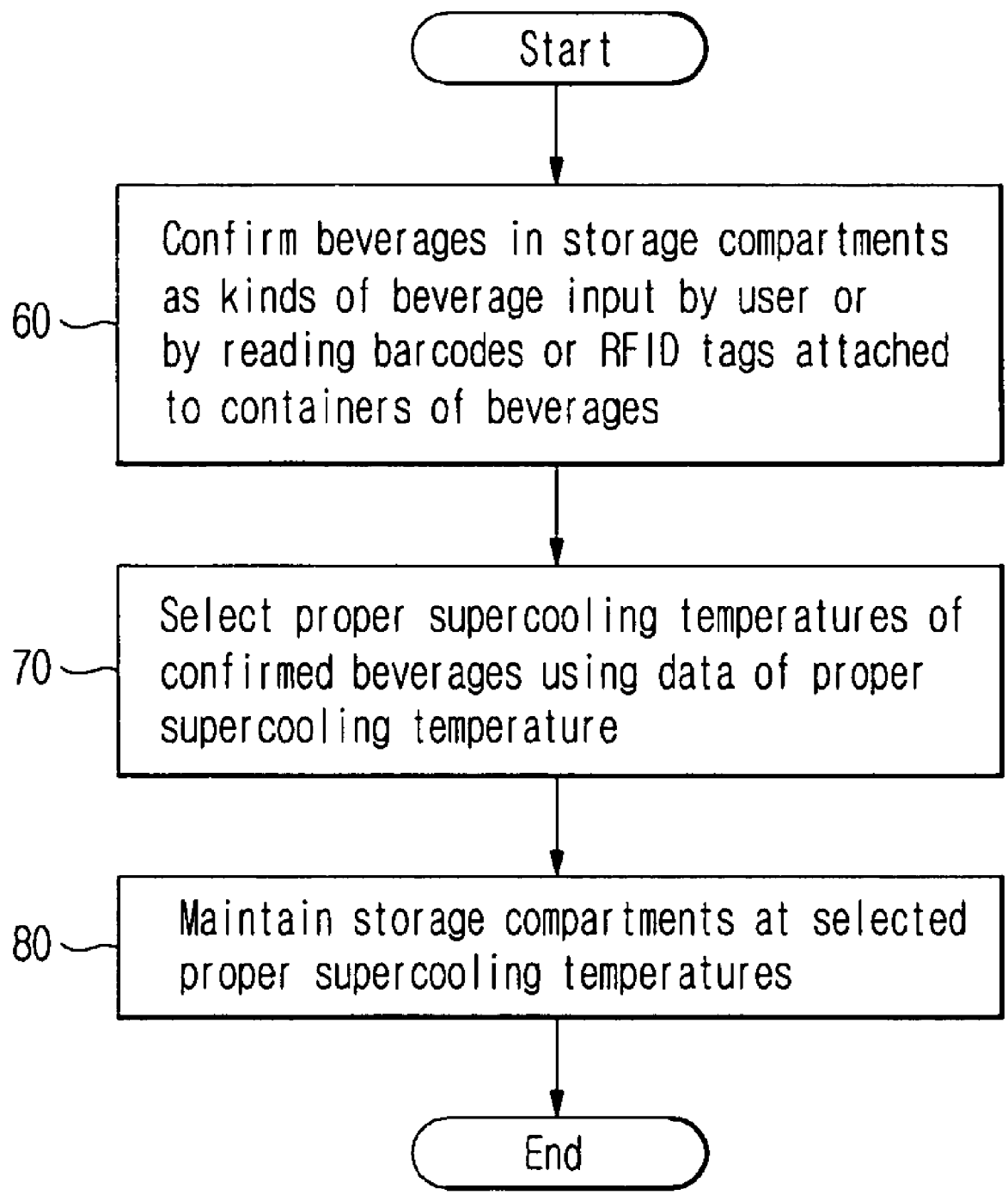
FIG. 6 is a flow diagram illustrating a method for controlling a supercooling apparatus in accordance with a second embodiment of the present invention.

A supercooling apparatus according to a second embodiment, and a method for controlling the same will be described with reference to FIG. 6. Unlike the first embodiment, the supercooling apparatus of the second embodiment includes a plurality of storage compartments such that different kinds of beverage are respectively placed in the storage compartments, and can adjust the respective storage compartments to have proper supercooling temperatures of the beverages different from each other. Except for the plural storage compartments, the second embodiment has the same configuration and supercooling method as those of the first embodiment, and thus is not illustrated in an additional drawing.

As in the first embodiment, manufacturers of the supercooling apparatus store data of proper supercooling temperature in a memory 26 after obtaining the data of proper supercooling temperature for beverages as described above. While placing the beverages in the plural storage compartments 11, a user inputs kinds of beverage via an input unit 21, or brings the beverages near a barcode reader 22 to read barcodes attached to containers of the beverages, thereby allowing a controller 20 to confirm the kinds of beverage to be stored in the storage compartment 11 (60).

At this time, the input unit 21 is provided with a button (not shown) with which the storage compartments 11 can be selected, so that, after selecting any of the storage compartments 11, the user inputs a kind of beverage or brings a certain beverage near the barcode reader 22 to read the barcode attached thereto, and then places the beverage into an associated compartment. Accordingly, the controller 20 can confirm where the beverage, the kind of which is input by the user, or having the barcode read by the barcode reader 22, is placed in any of the storage compartments 11.

In addition, according to the second embodiment, when the beverages are placed in the plural storage compartments 11, an RFID reader 24 communicates with a RFID tag 23 attached to each beverage to allow a controller to confirm the beverages input to the plural storage compartments (60). In this regard, according to the second embodiment, a method disclosed in Korean Laid-open Patent Publication No. 2005-88979 or Korean Patent Application No. 2004-63929 of the applicant of the present invention is used in order to allow the controller to confirm where the RFID tag 23 communicating with the RFID reader 24 is placed in any of the storage compartments 11. Accordingly, although not shown in the drawings, the plural storage compartments may further include a plurality of RFID tags or a plurality of RFID readers used to confirm storing places of the beverages. With the method as described above, the controller 20 can confirm specifically where the beverage having the RFID tag 23 is placed in any of the storage compartments 11.

After confirming the kinds of beverage stored in the storage compartment 11, the controller 20 selects a proper supercooling temperature of each beverage in each storage compartment 11 based on data of proper supercooling temperature stored in a memory 26 (70). The operation of selecting the proper supercooling temperature of the beverage denoted by 70 is the same as that of the first embodiment denoted by 40. Then, the controller 20 operates a refrigerating unit 25 such that the temperature of each storage compartment 11 becomes an associated proper supercooling temperature determined by the controller (80). For example, when water and an orange juice are stored in first and second storage compartments, respectively, the controller 26 controls the first storage compartment to have a temperature of −3.5° C. which is the proper supercooling temperature of water, and controls the second storage compartment to have a temperature of −7.0° C. which is the proper supercooling temperature of the orange juice.

Although the supercooling apparatuses of the first and second embodiments are described as being employed only to supercool the beverages, the present invention is not limited to this purpose, and is applicable to every kind of supercooling apparatus which has a supercooling function as in a conventional refrigerator including a supercooling compartment.

As apparent from the above description, according to the present invention, respective beverages can be stored at their own proper supercooling temperature so that the beverages are prevented from being frozen during a supercooling operation.

In addition, according to the present invention, the respective beverages are allowed to have a standard slush level, thereby preventing the slush level from changing according to kinds of beverage.

Moreover, according to the present invention, the supercooling apparatus includes a plurality of storage compartments so that various beverages can be stored at their own proper supercooling temperatures.

Although a few embodiments of the present invention have been shown and described, it would be appreciated by those skilled in the art that various modifications, additions and substitutions may be made in these embodiments without departing from the principle and spirit of the invention, the scope of which is defined in the claims and their equivalents.

What is claimed is:

1. A method for controlling a supercooling apparatus having a storage compartment to store a beverage and a refrigerating unit to refrigerate the storage compartment, comprising:

confirming a kind of beverage stored in the storage compartment;

determining a proper supercooling temperature for the beverage, based on the confirmed kind of the beverage; and controlling the refrigerating unit such that the storage compartment has a temperature reaching the determined proper supercooling temperature, wherein each of the beverages in the storage compartment is confirmed as a kind of beverage input by a user or by reading a barcode or a RFID tag attached to a container of the beverage, the proper supercooling temperatures is determined from data of proper supercooling temperature previously stored in a memory, and the data of proper supercooling temperature comprises a standard slush level, and a success ratio of each beverage corresponding to a temperature of the storage compartment.

2. The method according to claim 1, wherein, in determining the proper supercooling temperature, the proper supercooling temperature is set with reference to the success ratio.

3. The method according to claim 1, wherein, in determining the proper supercooling temperature, the proper supercooling temperature is set with reference to the standard slush level.

4. The method according to claim 1, wherein, in determining the proper supercooling temperature, one of the success ratio and the standard slush level is determined as a selection standard for the proper supercooling temperature according to a standard input by a user.

5. The method according to claim 1, wherein, in determining the proper supercooling temperature, one of the success ratio and the standard slush level is automatically determined as a selection standard for the proper supercooling temperature according to kinds of container containing the beverages.

6. The method according to claim 5, wherein the kinds of container are confirmed via a barcode or an RFID tag attached to each container.

7. The method according to claim 1, wherein the proper supercooling temperature is determined from data of proper supercooling temperature stored in the barcode or the RFID tag.

8. A supercooling apparatus, comprising:

a storage compartment to store beverages;

a refrigerating unit to refrigerate the storage compartment;

a controller to confirm a kind of beverage stored in the storage compartment, to determine a proper supercooling temperature for the beverage, based on the confirmed kind of the beverage, and to control the refrigerating unit such that the storage compartment has a temperature reaching an associated one of the determined proper supercooling temperature, wherein the proper supercooling temperatures is determined from data of proper supercooling temperature previously stored in a memory, and the data of proper supercooling temperature comprises a standard slush level, and a success ratio of each beverage corresponding to a supercooling temperature of the beverage.

9. The apparatus according to claim 8, wherein the controller determines one of the success ratio and the standard slush level as a selection standard for the proper supercooling temperature according to user's selection.

10. The apparatus according to claim 8, wherein the controller determines one of the success ratio and the standard slush level as a selection standard for the proper supercooling temperature according to kinds of container containing the beverages.

11. The apparatus according to claim 10, further comprising: a barcode reader to read a barcode attached to the container of each beverage or an RFID reader to read an RFID tag attached to the container of the beverage, wherein the kinds of container containing the beverages are confirmed via the barcodes or the RFID tags attached to the containers.

12. The apparatus according to claim 8, further comprising: an input unit through which kinds of beverage stored in the storage compartment are input by a user, and the controller confirms the beverages in the storage compartment as the kinds of beverage input by the user.

13. The apparatus according to claim 8, further comprising: a barcode reader to read a barcode attached to a container of each beverage or an RFID reader to read an RFID tag attached to the container of the beverage, wherein the controller confirms the beverages in the storage compartment by reading the barcodes or the RFID tags attached to the containers of the beverages.

14. The apparatus according to claim 13, wherein the controller obtains the proper supercooling temperature from the data of proper supercooling temperature stored in the barcode or the RFID tag.

* * * * *